May 1, 1951  H. M. LINHART  2,550,931
CONTROL APPARATUS FOR REVERSIBLE INTERNAL-COMBUSTION
ENGINES WITH CONVERTIBLE AIR STARTING MEANS
Filed June 29, 1945  3 Sheets-Sheet 3

*INVENTOR.*
*Harry M. Linhart*
BY
*ATTORNEY*

Patented May 1, 1951

2,550,931

UNITED STATES PATENT OFFICE 2,550,931

CONTROL APPARATUS FOR REVERSIBLE INTERNAL-COMBUSTION ENGINES WITH CONVERTIBLE AIR STARTING MEANS

Harry M. Linhart, Pitcairn, Pa., assignor to The Westinghouse Air Brake Company, Wilmerding, Pa., a corporation of Pennsylvania Application June 29, 1945, Serial No. 602,290

9 Claims. (Cl. 60—16)

This invention relates to control apparatus and more particularly to apparatus for controlling operation of a prime mover, such as a Diesel engine.

In the copending application of Roy R. Stevens, Serial No. 538,183, filed May 31, 1944, and assigned to the assignee of the present application, now Patent No. 2,413,390, issued December 31, 1946, there is disclosed a fluid pressure control apparatus for controlling the operation of a reversible Diesel engine. The apparatus comprises a fluid reversing motor for conditioning the engine for operation in either one direction or in the opposite direction and means controlled by said motor controls the supply of starting air to the engine in such a manner that there is an undesirable slight flow of starting air to the engine upon initiating a reversal of the engine and until after said reversing motor starts to operate. Immediately after the fluid motor starts to operate however the supply of starting air to the engine is cut-off and maintained cut off, as desired, until after the reversing operation has been completed at which time starting air is again supplied to the engine to cause the engine to start turning in the new or selected direction. Furthermore, if at the time a reversal of the engine is initiated the fluid motor should fail to operate, then starting air will be supplied to the engine and cause it to start or continue to operate in the direction the opposite of that intended and such operation is undesirable.

One object of the invention is therefore the provision of an engine control apparatus of the above general type which is so constructed as to prevent starting air being supplied to the engine until after the engine is conditioned for operation in the selected direction.

Other objects and advantages will be apparent from the following more detailed description of the invention.

In the accompanying drawings; Figs. 1, 1a, when taken together with the right-hand edge of Fig. 1 matched against the left-hand edge of Fig. 1a, is a diagrammatic view, mainly in section, of a fluid pressure control apparatus embodying the invention; Fig. 6 is a sectional view taken on line 6—6 in Fig. 1a; and Fig. 7 is a cross sectional view of a supply and release valve structure several of which are shown in side elevation in Figs. 1, 1a.

Description

In the drawings, the reference numeral 1 indicates a reversing control shaft of a reversible internal combustion engine, such as of the Diesel type, and this shaft may be connected to any conventional engine reversing means such as a longitudinally movable cam shaft for reversing the valve gear or valve timing of the engine. Rotation of the reversing shaft 1 in a counter-clockwise direction, as viewed in and to the position shown in the drawing, will condition the valve gear or timing to provide for operation of the engine in one or an astern direction, while rotation in the opposite direction to another position will condition said gear or timing to provide for operation of said engine in the reverse or an ahead direction.

The reference numeral 2 indicates a fuel control shaft for the above mentioned engine, and the numeral 3 indicates a lever connected to said shaft for turning same to either of two positions, namely, a fuel cut-off position in which it is shown in the drawing for cutting off the supply of fuel to the engine to cause stopping of the engine, and a fuel supply position indicated by a dot and dash line 4, for supplying fuel to the engine to allow operation thereof at a speed determined by the adjustment of the usual speed controlling means (not shown) associated with engines of this type.

The reference numeral 5 indicates a starting air valve device of any conventional type arranged to be controlled by pressure of fluid in a control pipe 6 for controlling the supply of starting air from a starting air supply pipe 7 to a pipe 8 through which it is adapted to be conveyed to the engine cylinders (not shown) by way of any conventional interlock or timing mechanism for causing the engine to start turning in the direction selected by the position of the reversing control shaft 1.

For the purpose of illustration the starting air valve device 5 may comprise a fluid pressure supply valve 116 for controlling communication between pipes 7 and 8, a release valve 117 for controlling communication between pipe 8 and an atmospheric port 118, and a piston 119 arranged to be operated by fluid under pressure supplied to a chamber 151 to seat said release valve and to open said supply valve. A spring 152 acts on piston 119 with such a pressure as to require the pressure of fluid in chamber 151 to be increased to a certain chosen degree such as forty pounds to operate said piston to open the supply valve 116. Upon release of fluid under pressure from chamber 151 spring 152 will return the piston 119 to the position shown in the drawing for opening the release valve 117 and to permit closing of the supply valve by a spring 153. The control of the supply and release of fluid under pressure to and from control pipe 6 will be hereinafter described.

The reference numeral 9 (Fig. 6) indicates an end portion of any rotatable part of the engine, such as the crank shaft, which rotates in a direction determined by the direction of operation of the engine. With the engine operating in one direction the crank shaft will therefore turn in a corresponding direction and upon operation of the engine in a reverse direction the crank shaft 9 will also turn in the reverse direction.

A power means in the form of a fluid motor 10 is provided for turning the reversing control shaft 1 to its different control positions. This motor comprises a casing containing a piston 11 having at one side a pressure chamber 12 and at the opposite side a pressure chamber 13. The piston 11 has a rod 14 projecting through chamber 13 and through a pressure head 15 closing the end of said chamber and into a casing member 16 secured to the outer face of said pressure head. Within the casing member 16 the rod 14 is provided on one side with gear teeth meshing with teeth on a gear wheel 17 which is mounted on and secured to the reversing shaft 1 for turning same upon reciprocation of piston 11. When piston 11 is in the position shown in the drawing, defined by contact of said piston with a pressure head 18 closing the end of chamber 12, the reversing shaft will be turned to the position shown in the drawing to condition the engine valve gear or timing to provide for starting and running of the engine in the astern direction, while upon movement of said piston to a position defined by contact with pressure head 15 the reversing shaft 1 will be turned to its other position to condition the valve gear or timing of the engine to provide for operation of the engine in its ahead direction.

The movement of piston 11 to the position shown in the drawing is arranged to be effected by supplying fluid under pressure to pressure chamber 13 to act on one side of said piston when fluid under pressure is released from chamber 12 at the opposite side of the piston, while movement of said piston to the position defined by contact with pressure head 15 is arranged to be effected by supplying fluid under pressure to chamber 12 when fluid under pressure is released from chamber 13.

The supply and release of fluid under pressure to and from chamber 13 is controlled by an astern pilot valve device 19 mounted on one side of a bracket 20 depending from the fluid motor casing, while the supply and release of fluid under pressure to and from pressure chamber 12 is arranged to be controlled by an ahead pilot valve device 21 mounted on the opposite side of said bracket.

Figure 7:
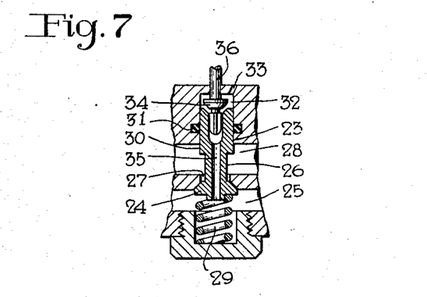

The astern pilot valve device 19 comprises a supply and release valve structure 23 which is shown in section and at an enlarged scale in Fig. 7 of the drawing. This structure comprises a supply valve 24 contained in a chamber 25 and having a stem 26 loosely extending through an opening 27 connecting said chamber to a chamber 28. The valve 24 is arranged to engage a seat in chamber 25 provided around the opening 27 for closing communication between said chamber and chamber 28 and is movable out of contact with said seat for opening said communication. A spring 29 in chamber 25 acts on the supply valve 24 for urging same into contact with its seat.

In chamber 28 the supply valve stem 26 is connected to a guide 30 of enlarged diameter which is slidably mounted in a bore in the casing. The casing is provided with an annular recess encircling the guide 30 and containing a sealing ring 31 having sealing and sliding contact with said guide for preventing leakage of fluid under pressure from chamber 28 past said guide to a chamber 32 provided at the end of said guide opposite the supply valve 24. Chamber 32 is in constant communication with atmosphere through a port 33 and contains a fluid pressure release valve 34 arranged to cooperate with a seat provided on the end of guide 30 to control communication between chamber 32 and one end of a bore 35 extending through the guide 30, the valve stem 26 and the supply valve 24 and opening at its opposite end to chamber 25. The release valve 34 is provided with a stem 36 which is mounted to slide in a suitable bore in the casing.

In the astern pilot valve device 19 the end of the release valve stem 36 is connected to a stem 37 projecting from a diaphragm follower 38 contained in a chamber 39 which is in constant communication with atmosphere through a passage 40. The stem 37 is slidably mounted in a suitable bore in the casing and its end contacts the release valve stem 36 in a chamber 41 which is open to atmosphere through a passage 42. Passage 33 above mentioned is open to atmospheric chamber 41.

The chamber 39 is formed at one side of a flexible diaphragm 43 which side also contacts the follower 38. At the opposite side of diaphragm 43 is a control chamber 44 which is connected to a control pipe 45. In chamber 39 a spring 46 acts on follower 38 with a chosen degree of pressure for urging said follower and diaphragm 33 to a position defined by contact between said diaphragm and a stop 47 in the casing. With the diaphragm 43 and follower 38 in this position spring 29 is adapted to seat the fluid pressure supply valve 24 and the release valve 34 is arranged to be opened as shown in Fig. 7. Movement of diaphragm 43 and follower 38 from this position in the direction of chamber 39 to a position defined by contact between said follower and the casing will cause the release valve 34 to be moved into seating engagement with the guide 30 and to then act through said guide to open the supply valve 24.

In the astern pilot valve device 19 chamber 28 is arranged to be constantly supplied with fluid under pressure from a fluid pressure supply pipe 48, while chamber 25 is connected by a passage 51 to pressure chamber 13 at one side of the power piston 11. In operation, when fluid is supplied to the control pipe 45 and thence to chamber 44 above diaphragm 43 at a pressure such as sixty pounds which overcomes the opposing pressure of spring 46, the diaphragm 43 will deflect to close the release valve 34 and to open the supply valve 24 whereupon fluid under pressure will flow from the supply pipe 48 to passage 51 leading to pressure chamber 13 at one side of power piston, while upon release of fluid under pressure from the control pipe 45 and diaphragm chamber 44, spring 46 will move follower 38 and diaphragm 43 to the position in which they are shown in the drawing to permit closing of the supply valve 24 by spring 29 and opening of the release valve 34 by pressure of fluid effective in chamber 25, whereupon fluid under pressure will be released from chamber 13 to the atmosphere.

The ahead pilot valve device 21 is structurally identical to the astern power valve device 19 and briefly comprises a supply and release valve structure 52 like the valve structure 23 shown in Fig. 7. In the valve structure 52 chamber 28 is constantly supplied with fluid under pressure from the supply pipe 48. Chamber 25 in this valve structure is connected by a passage 54 to pressure chamber 12 at the left-hand side of the power piston 11. Diaphragm chamber 44 in the ahead pilot valve device 21 is connected to an ahead control pipe 55. It will thus be seen that upon supply of fluid at for instance sixty pounds pressure to pipe 55 the ahead pilot valve device 21 will operate to supply fluid under pressure from the supply pipe 48 to pressure chamber 12 at the left-hand side of the power piston 11, while upon release of fluid under pressure from the control pipe 55 fluid under pressure will be released from said pressure chamber.

It will now be seen that when the ahead control pipe 55 is vented to atmosphere in a manner which will be later described, causing opening of pressure chamber 12 to atmosphere, and fluid at sufficient pressure is supplied to the astern control pipe 45, the astern pilot valve device 19 will operate to supply fluid under pressure to pressure chamber 13 at the opposite side of power piston 11 to thereby create a differential in fluid pressures on said piston which will effect movement thereof to the position in which it is shown in the drawing for thereby positioning the reversing control shaft 1 to provide for operation of the engine in the astern direction.

On the other hand, if fluid under pressure is supplied to the ahead control pipe 55, when the astern control pipe 45 and pressure chamber 13 are open to atmosphere in a manner which will be later described, the ahead pilot valve device 21 will act to supply fluid under pressure to pressure chamber 12. The power piston 11 will thereby be moved from the position in which it is shown in the drawing to its opposite position defined by contact with pressure head 15 to thereby condition the reversing shaft 1 to provide for operation of the engine in the opposite or ahead direction.

When both of the control pipes 45 and 55 are open to atmosphere, both the astern pilot valve device 19 and the ahead pilot valve device 21 will operate to open the respective pressure chambers 13 and 12 to atmosphere, under which condition the pressure acting on opposite sides of the power piston 11 will be the same and said piston will remain in the position to which it previously had been moved.

In the bracket 20 are two timing reservoirs or volumes 56 and 57 connected respectively to pipes 45 and 55 and thereby to diaphragm chambers 44 in the astern and ahead power valve devices 19 and 21. The purpose of these reservoirs will be hereinafter brought out.

The ahead and astern control pipes 55 and 45, respectively, lead to a fuel cut-off valve device 60 and in these pipes there are disposed flow controlling devices 61 and 62 respectively. The flow controlling valve device 61 comprises a check valve 63 arranged to open upon flow of fluid under pressure through the ahead control pipe 55 in the direction of the ahead pilot valve device 21 to allow a relatively rapid rate of flow, but to close upon flow of fluid under pressure through said pipe in the opposite direction. A choke 64 through the check valve 63 connects the opposite sides thereof for restricting the rate of flow of fluid under pressure away from the ahead pilot valve device 21, the flow capacity of the choke having a certain relation to the volume of the respective timing reservoir 57 as will hereinafter be brought out. The flow controlling valve device 62 in the astern control pipe 45 is identical to the flow controlling valve device 61 and comprises a check valve 63 arranged to permit relatively rapid flow of fluid under pressure through said pipe in the direction of the astern pilot valve device 19 but to close upon flow in the opposite direction, while a choke 64 through said valve is arranged to limit the rate of flow in said opposite direction, the flow capacity of this choke also bearing a certain relation to the volume of the timing reservoir 56 as will hereinafter be brought out.

The fuel cut-off device 60 is associated with the fuel control lever 3 and comprises a casing containing a piston 66 having a rod 67 arranged for engagement with the end of said lever. At one side of piston 66 is a pressure chamber 68 which is open to a control pipe 69 through which fluid under pressure is adapted to be supplied to and released from said chamber. Upon supply of fluid under pressure to chamber 68 the piston 66 will move to a position defined by contact between the piston and a shoulder 70 in the casing and this movement is adapted to act through rod 67 to move the fuel control lever 3 to the position shown in the drawing for cutting off the supply of fuel to the engine. At the opposite side of piston 66 is a non-pressure chamber 71 containing a spring 72 which is under pressure and acting on said piston in opposition to pressure of fluid in chamber 68. Upon release of fluid under pressure from chamber 68 this spring is adapted to move the piston 66 out of contact with shoulder 70 and to a position defined by contact of the piston with a cover 65 closing the outer end of pressure chamber 68, for thereby drawing the piston rod 67 in a direction away from the fuel control lever 3 to permit movement of said lever to the fuel supply position indicated by line 4.

At one side of the piston rod 67 is a latch 73 movable in directions toward and away from said rod. The piston rod 67 has a recess 74 arranged to receive the end of latch 73 for holding said rod and the fuel control lever 3 in fuel cut-off position shown in the drawing when fluid under pressure is released from chamber 68. The latch 73 is operatively connected to a piston 75 having at the latch side a pressure chamber 76 which is open to a control pipe 77, and having at the opposite side a non-pressure chamber 78 containing a spring 79. The spring 79 is under pressure and constantly acting on piston 75 to urge the latch 73 in the direction of the piston rod 67. Upon supply of fluid under pressure to pressure chamber 76, such pressure is adapted to actuate piston 75 to disengage latch 73 from the piston rod 67.

Associated with the fuel cut-off valve device 60 are two interlock valve devices 82 and 83. The interlock valve device 82 is provided for controlling communication between the ahead control pipe 55, and a control pipe 84 and atmosphere, while the interlock valve device 83 is provided for controlling communication between the astern control pipe 45, and a control pipe 85 and atmosphere.

The interlock valve device 82 comprises a supply valve 86 contained in a chamber 87 and having a fluted stem slidably mounted in a suitable bore in the casing connecting said chamber to a chamber 88, said stem extending into the latter chamber where it engages a stem projecting from an oppositely seating release valve 89 contained in a chamber 90 which is open to atmosphere through a port 91. The release valve 89 is provided for controlling communication between chamber 88 and chamber 90 and thus the atmosphere by way of a bore through a sleeve 80 which is slidably mounted in the casing. A spring 81 in chamber 88 acts on one end of sleeve 80 for urging same in the direction of the release valve 89 against which it is adapted to seat to close the communication controlled thereby. A shoulder 58 is provided for engagement by the opposite end of sleeve 80 to limit movement thereof by spring 81 to a position in which the release valve 89 will be unseated by movement of the supply valve 86 into contact with its seat under the pressure of a spring 59 contained in chamber 87.

On the side opposite the release valve seat the release valve 89 is engaged by one end of a plunger 49 which is supported in the casing and which has its opposite end in contact with the peripheral surface of the piston rod 67. When the piston 66 and rod 67 occupy the position in which they are shown in the drawing, a recess 50 in said rod is moved out of registry with plunger 49 and said plunger is displaced to a position for seating the release valve 89 and opening the supply valve 86. When the piston 66 and rod 67 are moved to the fuel supply position defined by contact between said piston and cover 65 the recess 50 will be positioned to receive plunger 49 to permit closing of valve 86 by spring 59 and to permit opening of the release valve 89. Chamber 87 in the interlock valve device 82 is connected to the control pipe 84 above mentioned, while chamber 88 is connected to the ahead control pipe 55.

The interlock valve device 83 is structurally identical to the interlock valve device 82 and the same reference numerals have therefore been applied to corresponding parts of the former. The piston rod 67 is operative to effect closure of the release valve 89 and opening of the supply valve 86 in the interlock valve device 83 upon movement of said rod to the position in which it is shown in the drawing, and is provided with a recess 53 arranged to receive plunger 49 to permit closure of said supply valve and opening of said release valve in the fuel supply position of said rod. Chamber 87 in the interlock valve device 83 is connected to the control pipe 85, while chamber 88 is connected to the ahead control pipe 45.

A reversing interlock structure 92 is mounted on the casing member 16 which is connected to the pressure head 15 of fluid motor 10 and this structure comprises ahead and astern interlock valve devices 93 and 94.

The interlock valve devices 93 and 94 may be identical in structure to the valve device 23 shown in Fig. 7 of the drawing. In the interlock valve device 93 chamber 28 is connected to the ahead control pipe 84 while chamber 25 is connected to a pipe 95. In the astern interlock valve device 94 chamber 28 is connected to the astern control pipe 85 and chamber 25 is connected to a pipe 96. The pipes 95 and 96 are connected to the opposite ends of a double check valve device 97 the third outlet of which is connected to a pipe 98 leading to one end of another double check valve device 99. The side outlet of the double check valve device 99 is connected to pipe 69 leading to a piston chamber 68 in the fuel cut-off valve device 60.

The two interlock valve devices 93 and 94 are spaced from each other with their axes arranged, diagrammatically in parallel relation and in the same plane. The release valve stems 36 of the two interlock valve devices 93 and 94 engage individual plungers 102 which are slidably mounted in suitable bores in the casing provided at one side of a longitudinally movable cam 103. Interposed between the end of each of the plungers 102 and having contact with the adjacent side of cam 103 is a roller or ball 104.

The cam 103 is operatively connected by a pin 105 to one end of a rocker 106 which is mounted to turn on a fulcrum pin 107 provided in the casing member 16. The pin 107 provides for rocking of rocker 106 and thereby movement of cam 103 in a direction parallel to the length of the piston rod 14. At each of the opposite sides of fulcrum pin 107 the rocker 106 is provided with an operating finger 108, one of these fingers being provided for contact with a plunger 109 while the other engages a similar plunger 110. The two plungers 109 and 110 are mounted to slide in suitable parallel bores in the casing at one side of the piston rod 14, and the opposite ends of said plungers contact said rod on the side opposite the gear 17.

The piston rod 14 is provided with two recesses 111 and 112 arranged to receive one end of plungers 109 and 110. These recesses which are arcuate in form are spaced from each other and connected together by a flat surface 113 formed below the surface of the piston rod at opposite ends of the two recesses.

With the piston 11 and rod 14 in the position shown in the drawing it will be noted that plunger 110 is substantially at the bottom of recess 112 while plunger 109 is out of said recess and both of said plungers are engaging the respective fingers 108 of rocker 106 thereby holding said rocker against movement and securing the cam 103 against movement out of the position in which it is shown in the drawing, which is one of three different positions of the cam the other two of which will now be described.

Upon movement of piston 11 and rod 14 out of the position shown in the drawing in the direction of the right-hand the pin 109 will be permitted to move into recess 112 as the pin 110 is moved out of said recess and this movement of pin 110 will rock rocker 106 in a clockwise direction. When the pin 110 is moved out of recess 112 to a position where the surface 113 may move under said pin the rocker 106 will have obtained a neutral position and cam 103 will have been moved from the position shown in the drawing in the direction of the right-hand to a second one of its positions. The surface 113 is so arranged that upon continued movement of piston rod 14 in the direction of the right hand the pin 109 will move out of recess 112 and onto said surface without changing the position of the rocker 106. The piston 11 and power piston rod 14 will then continue to move relative to and without further operation of rocker 106 and cam 103 until it approaches the pressure head 15 at which time plunger 110 will be engaged by the inclined surface of recess 111 adjacent the piston 11. When this occurs further movement of piston rod 14 will act through plunger 110 to rock the rocker 106 further in a clockwise direction and this will be permitted since plunger 109 will be positioned at this time to enter the recess 111, so that by the time piston 11 attains the position in contact with pressure head 15, the plunger 110 will have been moved out of recess 111 and plunger 109 will be substantially at the bottom of said recess, so that the cam 103 will have been moved past its neutral position to its third position.

It will thus be seen that as the piston 11 is moved from the position shown in the drawing to its opposite position the initial movement of the piston will move the cam 103 out of the position shown in the drawing to a neutral position and then said cam will remain in this position until the piston 11 has substantially attained its opposite position at which time the cam 103 will be moved to a position opposite that shown in the drawing. Likewise, upon movement of piston 11 from the position defined by contact with pressure head 15 to the position in which it is shown in the drawing the cam 103 will be shifted from its right-hand position first to its neutral position and then back to the position in which it also is shown in the drawing, in a manner which will be apparent from the above description.

The cam 103 is provided with a recess 115 for receiving rollers 104 of the ahead and astern interlock valve devices 93 and 94. This recess is so arranged that with the cam 103 in the position shown in the drawing the release valve 34 in the astern interlock valve device 94 will be opened so as to open the astern control pipe 85 to atmosphere, while in the ahead interlock valve device 93 the supply valve 24 will be open so as to open communication between the ahead control pipe 84 and pipe 95. In the opposite position of cam 103 the condition of the ahead and astern interlock valve devices 93 and 94 will be reversed, that is, so as to open the ahead control pipe 84 to atmosphere past the respective release valve 34 and to connect the astern control pipe 85 to pipe 96 by way of the respective supply valve 24. In the neutral position of cam 103 the supply valve 24 of both of the ahead and astern interlock valve devices 93 and 94 will be opened so as to establish communication between pipes 84 and 95, and pipes 85 and 96, respectively.

The reference numeral 120 indicates a directional control valve device which is arranged to control supply and release of fluid under pressure to and from pipe 77 leading to pressure chamber 76 at one side of the latch piston 75 in the fuel cut-off valve device 60. The directional control valve device 120 comprises a casing containing a double check valve 121 controlling communication between pipe 77 and two passages 122 and 123. In one position of the double check valve 121 pipe 77 will be disconnected from the passage 123 and connected to passage 122, while in another or upward position of said double check valve said pipe will be connected to passage 123 and disconnected from passage 122. The passages 122 and 123 lead respectively to chambers 128 in astern and ahead valve devices 124 and 125.

The two valve devices 124 and 125 may be identical in construction each comprising a supply valve 126 contained in a chamber 127 and arranged to control communication between said chamber and a chamber 128. A spring 129 in chamber 127 acts on valve 126 to seat same. In the astern valve device 124 chamber 127 is connected to the astern control pipe 85, while in the ahead valve device 125 said chamber is connected to the ahead control pipe 84.

In each of the valve devices 124 and 125 the chamber 128 contains a release valve 130 which contacts a fluted stem projecting from the supply valve 126. The release valve 130 has a fluted stem 131 slidably mounted in a bore in a plunger 132 which is mounted to slide in a bore in the casing. Around plunger 132 the casing is provided with a recess containing a sealing ring 133 having sealing and sliding contact with a peripheral surface of said plunger for preventing leakage of fluid under pressure from chamber 128 past the plunger. The bore in plunger 132 in which stem 131 of the release valve 30 is slidably mounted opens to a larger bore 134 the outer end of which is closed by a hollow plug 135. The bore 134 is constantly open to atmosphere through one or more ports 136 provided through plug 135 adjacent the closed end thereof. A plunger 137 loosely mounted in bore 134 has one end in contact with the release valve stem 131. Against the opposite end of plunger 137 bears one end of a spring 139 the opposite end of which is supported by contact with the inner end of plug 135. This spring is under compression and therefore constantly effective to urge the plunger 132 in a direction away from and thus out of seating engagement with the release valve 130.

The casing of the directional control device is provided midway between the outer ends of the two plugs 135 with a depending lug 140 carrying a fulcrum pin 141 upon which is rockably mounted a lever 142 having two oppositely arranged arms 143 one of which is disposed over the end of each of the two plugs 135. In the end of each arm 143 is secured an adjustable actuating screw 144 which engages the respective plug 135. With the parts of the directional control valve device in the position shown in the drawing the two screws 144 are so adjusted as to permit springs 129 to move the respective supply valves 126 into contact with their seats and to permit movement of plungers 132 by springs 139 out of contact with the respective release valves 130.

Figure 6:
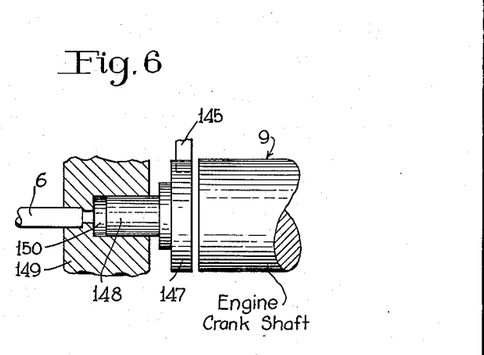

The lever 142 is also provided with a depending operating arm 145 the end of which is loosely accommodated in a recess 146 provided in and open to the peripheral edge of a friction disc 147. The disc 147 is carried by one end of a plunger 148 (Fig. 6) which is slidably mounted in a bore provided in a casing structure 149 which is adapted to be rigidly supported with respect to the engine so as to support the friction disc in coaxial relation with the end of the crank shaft 9 as shown in Fig. 6 of the drawings. The plunger 148 is also effective in the capacity of a piston for moving the friction disc into frictional contact with the end of the engine crank shaft 9, and to effect such movement its inner end is adapted to be subjected to pressure of fluid in a pressure chamber 150 which is open to the starting control pipe 6.

An operator's control valve device 155 is provided for controlling operation of the apparatus so far described. The operator's control valve device comprises what may be called ahead and astern control valve devices 156 and 157, respectively, a stop valve device 158, a start valve device 159, and a self-lapping speed control valve device 160.

The ahead and astern control valve devices 156 and 157, stop valve device 158 and the start valve device 159 may all be structurally like the valve device shown in Fig. 7 of the drawings, and the fluid pressure supply chamber 28 in each is arranged to be constantly supplied with fluid under pressure from a supply pipe 162. Fluid at a desired reduced pressure, such as 100 pounds per square inch, is supplied to pipe 162 from the supply pipe 48 by operation of a reducing valve device 163 of any suitable structure.

The supply valve chamber 25 in the ahead and astern control valve devices 156 and 157 are connected to the ahead and astern control pipes 84 and 85, respectively. Chamber 25 in the stop valve device 158 is connected to a pipe 164 which leads to the end of double check valve device 99 opposite to that to which pipe 98 is connected. Chamber 25 in the start valve device 159 is connected to a pipe 101.

The operator's control valve device further comprises an operating shaft 165 which is supported and suitably journaled at opposite ends in the casing of the device. The shaft 165 is in the form of a tube and mounted within said shaft for longitudinal movement is an operating plunger 166 which extends out beyond the opposite ends of said shaft. Secured to the exterior of the operating shaft 165 is a member 167 on the peripheral surface of which are provided three cams 168, 169 and 170.

The operating shaft 165 has a slot 171 through one side thereof, and registering with this slot is a through slot 172 in the plunger 166 and a slot 173 in the member 167. Extending through these slots is a part 174 of an operator's control lever 175 and in the end of the part 174 is a slot through which extends a pin 176 which is secured in the plunger 166. The lever 175 is mounted to turn on a pin 177 secured in an upwardly extending projection 178 of member 167. By this construction it will be seen that movement of the operator's control lever 175 in a direction lengthwise of plunger 166 will move said plunger relative to the operating shaft 165 in either one direction or in the opposite direction and without turning said shaft, while movement of said lever in the direction circumferentially of the shaft 165 will turn said shaft without longitudinal movement of plunger 166.

Figure 2:
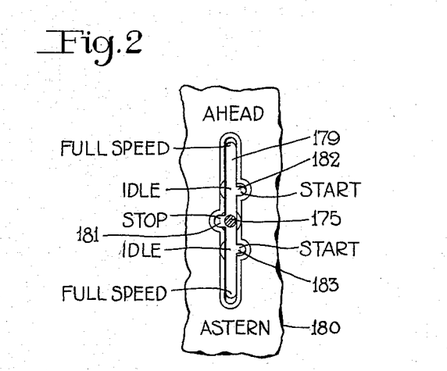
Fig. 2 is a partial plan view of a manual control device shown mainly in vertical section in Fig. 1.
Figure 3:
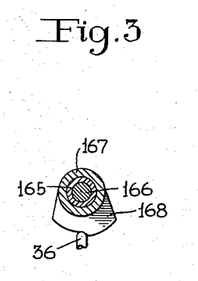
Figs. 3, 4 and 5 are sectional views of said control device taken on lines 3—3, 4—4 and 5—5 in Fig. 1.

The operator's control lever 175 extends through a slot 179 provided in a cover 180 which is secured to the casing of the device. This slot extends in a direction to permit movement of the operator's control lever to rock the shaft 165 and cam member 167. In the slot 179 the operator's control lever 175 may have a neutral position in which it is shown in Fig. 2 of the drawing, and may be movable from this position in either an ahead direction or in the opposite or an astern direction as indicated by legends in Fig. 2.

Midway between the ends of the slot 179 there is a relatively shallow recess 181 open to one side of said slot and into which the operator's control lever is adapted to be moved out of said slot for moving the plunger 166 longitudinally in one direction in the operating shaft 165. At one side of the recess 181 and opening to the opposite side of slot 179 is another relatively shallow recess 182 into which the operator's control lever is adapted to be moved for moving the plunger 166 lengthwise in the shaft 165 in the opposite direction. At the opposite side of recess 181 is a third recess 183 for receiving the lever 175 to permit movement of plunger 166 in the same direction as when moved into the recess 182.

The operator's control lever has a "Stop" position in recess 181 which position is adjacent its neutral position above mentioned in slot 179. At the "Ahead" side of neutral position the operator's control lever has an engine "Idle" position in slot 179 opposite recess 182 and an engine "Start" position in said recess. Movement of the lever beyond the "Idle" position just mentioned in the direction of the legend "Ahead" is adapted to accelerate the engine, in a manner to be later described, in accordance with the position of said lever between said "Idle" position and the extreme upper end of slot 179, full speed of the engine being obtained at said end of slot 179 indicated by the legend "Full speed." Corresponding "Idle," "Start" and "Full speed" positions of the operator's control lever are provided at the opposite or "Astern" side of neutral position, said "Start" position being provided in recess 183. The space between recess 183 and the "Astern" end of slot 179 constitutes the speed control zone for operation of the engine in the astern direction.

The ahead and astern valve devices 156 and 157 are arranged with the axes of the release valve stems 36 at right angles to the axes of cams 168 and 170 and in contact respectively with the peripheral surfaces of said cams. The cam 168 is so designed as to actuate the astern valve device 157 to connect the fluid pressure supply pipe 162 to the astern control pipe 85 when the operator's control lever 175 is in any position between and including the "Idle" and "Full Speed" position at the "Astern" side of neutral position and to permit operation of said valve device to open the control pipe 85 to atmosphere in all other positions of said lever. The cam 170 is identical to cam 168 but reversely arranged so as to thereby actuate the ahead valve device 156 to open the ahead control pipe 84 to the fluid pressure supply pipe 162 in and between the "Idle" and "Full speed" positions at the "Ahead" side of neutral position of lever 175 and to permit operation of said valve device to open the ahead control pipe 84 to atmosphere in all other positions of said lever.

The self-lapping speed control device 160 is provided to vary pressure of fluid in a speed control pipe 164a to govern means, not shown in the drawing and which form no part of the present invention, for varying the speed or power output of the engine in proportion to the pressure of such fluid. By way of illustration the device 160 may be substantially like that fully disclosed in the copending application of Harry C. May, Serial No. 523,656, now Patent No. 2,381,222, issued August 7, 1945, filed February 24, 1944, and assigned to the assignee of the present application, and briefly comprises a control plunger 185 and means (not shown) operable upon displacement of said plunger from a normal position, in which it is shown in the drawing, into the device to provide fluid in pipe 164a at a pressure corresponding to the degree of such displacement. With plunger 185 in its normal or outermost position a minimum pressure of fluid such as atmospheric will be provided in pipe 164a which is adapted to cause operation of the engine at idling speed.

Figure 4:
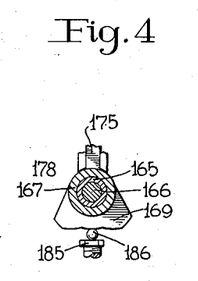
Figure 5:
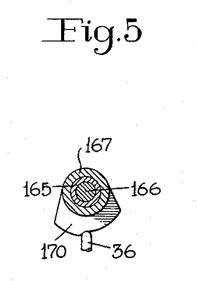

The cam 169 is provided for controlling the displacement of plunger 185 and is operatively connected thereto through the medium of one end of an arm 186 the opposite end of which is fulcrumed to rock on a pin 187. The cam 169 is so designed (Fig. 4) as to allow the plunger 185 to remain in its normal position shown in the drawing with the operator's control lever 175 in any position between and including the two "Idle" positions, and is operable upon movement of the lever beyond either of said "Idle" positions to depress the plunger 185 a degree in proportion to the extent of such movement. The maximum displacement of plunger 185 into the device, and, therefore, the maximum pressure of fluid will be obtained in the speed control pipe 164a upon movement of the operator's control lever to either of the "Full speed" positions.

One end of plunger 166 is operatively connected to one end of a lever 190, the opposite end of which is fulcrumed on a pin 191 secured in the casing, while an intermediate portion of said lever contacts the release valve stem 36 of the starting valve device 159. These parts are so arranged and designed that movement of plunger 166 in response to movement of the operator's control lever 175 to either "Start" position, i. e., into either of the recesses 182 or 183, will operate the start valve device 159 to supply fluid under pressure to the starting control pipe 101, while with said lever out of the recesses 182 or 183 said valve device will operate to release fluid under pressure from pipe 101.

The opposite end of plunger 166 is operatively connected to one end of a lever 193 the opposite end of which is fulcrumed on a pin 194 secured in the casing. An intermediate portion of lever 193 contacts the release valve stem 36 of the stop valve device 158 and the parts are so arranged that upon movement of lever 175 into recess 181 the longitudinal movement of plunger 166 will operate the stop valve device 158 to supply fluid under pressure from the supply pipe 162 to pipe 164. With the operator's control lever 175 out of recess 181 the plunger 166 will be positioned to effect operation of the stop valve device 158 to open pipe 164 to atmosphere.

The parts of the apparatus so far described are substantially identical to corresponding parts of the control apparatus fully disclosed in the patent to Roy R. Stevens hereinbefore referred to. According to the invention I associate with this apparatus a starting interlock valve device 200 arranged to be controlled by pressure of fluid in pipe 69, which also controls the fuel cut-off valve device 60, for controlling communication between pipe 101 from the start valve device 159 in the operator's control valve device 155 and pipe 6 leading to the starting air valve device 5 and to the directional control valve device 120.

The starting interlock valve device 200 comprises a casing having a chamber 201 open to atmosphere through a port 202 and containing a valve 203. The valve 203 is provided with a fluted stem slidably mounted in a bore through a wall separating chamber 201 from a chamber 204 and said valve is arranged to control communication between said chambers. A spring 205 in chamber 201 acts on valve 203 for urging it to its closed position shown. The stem of valve 203 extends into chamber 204 and therein engages a valve 206. The valve 206 has a fluted stem 207 slidably mounted in a bore provided in a plunger 208 which in turn is slidably mounted in a sleeve 209 secured in the casing. Above the end of the valve stem 207 the plunger 208 is provided with a plurality of radial ports 210 connecting the bore within the plunger to an annular recess 211 encircling said plunger. The recess 211 is in turn open through a plurality of radial ports 212 in the sleeve 209 to a cavity 213 encircling the sleeve. Cavity 213 is in constant communication with pipe 101, and chamber 204 containing the valve 206 is in constant communication with the pipe 6.

Above the end of sleeve 209 the plunger 208 is provided with an enlarged cylindrical portion 214 which is slidably mounted in the casing. The upper open end of portion 214 is closed by a cap 215 and slidably mounted within said portion is a plunger 216. The plunger 216 has a stem 217 freely extending through an axial bore in plunger 208 and engaging the end of stem 207 opposite valve 206. Also contained in the portion 214 is a spring 218 which acts on the plunger 216 in a direction to move plunger 208 out of seating relation with valve 206. The pressure of spring 218 is less than the opposing pressure of spring 205 on the valve 203.

The cap 215 constitutes a follower which engages one side of a flexible diaphragm 219 which is clamped around its edge in the casing. The diaphragm 219 forms at the side containing the cylindrical portion 214 of the plunger one side of a chamber 220 which is in constant communication with atmosphere as by way of a port 220a. At the opposite side of diaphragm 219 is a pressure chamber 224 which is open to pipe 69. A spring 221 in chamber 220 acts on diaphragm 219 in opposition to pressure of fluid in chamber 224 with a force such as to require for example thirty pounds pressure in chamber 224 to overcome said spring and move the diaphragm out of the position in which it is shown in the drawing. A chamber 222 below the cylindrical portion 214 may be open to atmosphere through a port 223.

*Operation*

In operation, let it initially be assumed that the operator's control lever 175 is in its neutral position as shown in Fig. 2 of the drawing, in which position the ahead and astern valve devices 156 and 157 will be in the position opening the ahead and astern pipes 84 and 85, respectively to atmosphere; the stop valve device 158 will be in the position opening pipe 164 to atmosphere, the start valve device 159 will be in the position opening pipe 101 to atmosphere; and the plunger 185 of the speed control valve device 160 will be in the normal position shown in the drawing.

Let it further be assumed that the engine is stopped from previous operation in an astern direction, under which condition the power piston 11 will be occupying the position shown in the drawing for positioning the reversing shaft 1 for operation of the engine in the astern direction. With the power piston 11 thus positioned the parts of the reversing interlock structure 92 will occupy the position in which they are shown in the drawings, opening pipe 95 to pipe 84 and thence to atmosphere through the operator's control valve device 155, and also opening pipe 96 to atmosphere through the astern interlock valve device 94. Pipe 98 will therefore be open to atmosphere by way of pipe 96, and since pipe 164 is open to atmosphere through the stop valve device 158 in the operator's control valve device, pipe 69 will also be open to atmosphere by way of pipe 164.

With pipe 69 open to atmosphere the diaphragm chamber 224 in the starting interlock valve device 200 will be open to atmosphere under which condition spring 221 will position diaphragm 219 and plunger 208 as shown in the drawing; spring 205 will seat the valve 203, while spring 218 will maintain valve 205 in contact with the stem of valve 203 and out of contact with the end of plunger 208. Thus with the control pipe 69 open to atmosphere, as just described, the starting control pipe 101 will be connected to pipe 6 and since pipe 101 is open to atmosphere through the starting valve device 159 in the operator's control valve device, pipe 6 will also be vented under which condition the parts of the starting air valve device 5 will occupy the position in which they are shown in the drawing closing communication between the starting air supply pipe 7 and pipe 3 and opening the latter pipe to atmosphere.

With pipe 6 open to atmosphere piston chamber 150 in the directional control device will be vented so that the disc 147 will be freed from the end of crank shaft 9 and the parts of the astern and ahead valve devices 124 and 125 will assume the positions shown in the drawings due to the seating action of springs 129 on the valves 126 exceeding the opposing pressure of springs 139 on the respective release valves 130, and plungers 132 will therefore be urged out of contact with the respective release valves and move the lever 142 to its neutral position in which it is shown in the drawing.

With the release valves 130 in the directional control valve device open as just mentioned, the latch piston chamber 76 in the fuel cut-off valve device 60 will be open to atmosphere by way of pipe 77, past the double check valve 121, through passage 122 and past the release valve 130 in the astern valve device 124. In the fuel cut-off valve device 60 spring 79 will therefore be effective to urge the latch 73 into contact with the piston rod 67.

Let it further be assumed that piston 66 and rod 67 in the fuel cut-off valve device 60 are positioned as shown in the drawing holding the fuel control lever or arm 3 in the position for cutting off the supply of fuel to the engine and in which position latch 73 will interengage with said rod within recess 74 to maintain the fuel cut off with fluid released from piston chamber 68 by way of pipe 69 as above described. The manner in which piston 66 is operated to cut off the supply of fuel to the engine and in which latch 73 is rendered effective as just described will be apparent from description to follow.

With rod 67 in the fuel cut-off valve device in the position just described the interlock valve devices 82 and 83 will be conditioned to open pipes 45 and 55 to pipes 85 and 84, respectively, which latter pipes are open to the atmosphere through the valve devices 157 and 158 in the operator's control valve device as above described. With pipes 45 and 55 thus open to atmosphere the parts of the astern pilot valve device 19 and of the ahead pilot valve device 21 associated with the fluid motor 10 will assume the positions in which they are shown in the drawing to open chambers 13 and 12, respectively, at opposite sides of the power piston 11 to atmosphere.

Let it further be assumed that pipe 48 is supplied with fluid at the desired pressure from any suitable source. Fluid thus supplied to pipe 48 will flow to chambers 28 in the astern pilot valve device 19 and in the ahead pilot valve device 21 associated with the fluid motor 10, and also to the reducing valve device 163 which will then operate to supply fluid at the desired reduced pressure to pipe 162. Fluid supplied to pipe 162 will then flow to chambers 28 in the ahead and astern pilot valve devices 156 and 157, respectively, in the stop valve device 158 and in the start valve device 159 and also to the speed control device 160 in the operator's control valve device 155.

With the control apparatus conditioned as just described, if the operator desires to start the engine in the direction of its last operation, that is, in the astern direction in the present instance, he will move lever 175 from neutral position in the "Astern" direction to "Idle" position adjacent recess 183 and then, if desired, directly into said recess. This movement of lever 175 to the "Astern" "Idle" position will effect operation of the astern valve device 157 to supply fluid under pressure to the astern control pipe 85, while movement of the lever into recess 183 will effect operation of the starting valve device 159 to supply fluid under pressure to pipe 101 leading to the starting interlock valve device 200.

Fluid under pressure thus supplied to the astern control pipe 85 will flow to the supply valve chamber 127 in the astern valve device 124 in the directional control valve device 120 but the respective supply valve 126 will be closed at this time. Fluid supplied to the astern control pipe 85 will also flow to the astern interlock valve device 94 in the reversing interlock structure 92 but the supply valve 24 in this valve device is also closed at this time. Fluid under pressure supplied to the astern control pipe 85 will also flow to the interlock valve device 83 in the fuel cut-off valve device 60 and since at this time the respective supply valve 83 is open fluid under pressure will flow from pipe 85 to pipe 45 and thence past check valve 63 therein to timing chamber 56 and to diaphragm chamber 44 in the astern pilot valve device 19 carried by the bracket 20.

When the pressure of fluid thus provided in the timing chamber 56 and in diaphragm chamber 44 of the astern valve device 19 becomes increased to the chosen degree such as 60 pounds above mentioned, it will overcome the opposing pressure of spring 46 on diaphragm 43 and deflect said diaphragm to its lower position to operate the supply and release valve structure 23 to supply fluid under pressure from pipe 48 to passage 51 leading to pressure chamber 13 at the right-hand side of the power piston 11. With piston 11 in the astern position, shown in the drawing, the pressure of fluid thus provided in pressure chamber 13 will be without effect; it being noted that reversing shaft 1 is already in the position of previous operation of the engine to provide for operation in the same or astern direction.

When the operator's control lever 175 is moved from its neutral position into the starting recess 183 to effect starting of the engine in its last or astern direction of operation, pipe 69 will remain at atmospheric pressure by way of pipe 164 and past the open release valve 34 in the stop valve device 158 in the operator's control valve device. With pipe 69 thus open to atmosphere, the parts of the starting interlock valve device 200 will be in the position shown in the drawings, so that fluid under pressure supplied by the start valve device 159 to pipe 101, upon movement of the operator's control lever 175 to the "Astern" "Start" position will flow past valve 206 in the interlock valve device 200 to pipe 6 leading to the starting air valve device 5 and to the directional control valve device 120. Thus immediately upon operation of the operator's control lever 175 to initiate starting of the engine in the direction of last operation, fluid under pressure will be supplied to chamber 151 in the starting air valve device 5 and when this pressure is increased to the chosen degree, such as forty pounds, said device will be operated to supply engine starting air from pipe 7 to pipe 8 and thence to the starting mechanism of the engine. The engine will then start to turn under the pressure of starting air provided through pipe 8 and in the direction determined by the position of the reversing shaft 1, or in the astern direction in the present instance.

When fluid under pressure is supplied to pipe 6 to effect starting of the engine as just mentioned, fluid from said pipe will also flow to chamber 150 in the directional control device 120 and therein act on plunger 148 to move disc 147 into frictional contact with the end of the crank shaft 9. Then as soon as the engine crank shaft 9 starts to turn under the pressure of starting air supplied through pipe 8 and in the direction determined by the reversing shaft 1, said turning will rock disc 147 in a corresponding, or counterclockwise or astern direction, as viewed in Fig. 1a, and turn lever 142 in a clockwise direction about its connection with pin 141.

In the astern valve device 124, this rocking of lever 142 in a clockwise direction will move plunger 132 into seating contact with release valve 130 and then act through said valve to unseat the respective supply valve 126, whereupon fluid under pressure from the astern control pipe 85 will flow past said supply valve to passage 122 and thence to the upper end of the double check valve 121. With the double check valve 121 already in the position shown in the drawing, fluid under pressure supplied to passage 122 will flow past said check valve to pipe 77 and thence to pressure chamber 76 below the latch piston 75 and when this pressure becomes sufficient to overcome the opposing force of spring 79 said piston will be moved in a direction away from rod 67 for thereby withdrawing the latch 73 from the recess 74. At this time piston chamber 68 is open to atmosphere by way of pipe 69, so that as soon as latch 73 is withdrawn from recess 74 spring 72 will move piston 66 and thereby rod 67 to the position defined by contact between said piston and cover 65, and this will permit movement of the fuel control lever 3 from its fuel cut-off position to the position indicated by line 4 for supplying fuel to the engine. With the engine already turning under pressure of starting air provided through pipe 8, this supply of fuel to the engine will allow the engine to fire and then run on fuel.

After the engine is running on fuel the operator will move lever 175 out of starting recess 183 into slot 179 and if the lever is allowed to remain in the adjacent "Idle" position the engine will then continue to run on fuel at a minimum or idling speed.

Movement of the operator's control lever out of recess 183 into slot 179 will also effect operation of the starting valve device 159 to release fluid under pressure from pipe 101 and thereby from the connected pipe 6, so that the starting valve device 5 will operate to cut off the supply of engine starting air to pipe 8. This release of fluid under pressure from pipe 6 will also result in release of fluid under pressure from piston chamber 150 in the directional control valve device 120, whereupon the friction disc 147 will free itself from the revolving crank shaft 9. The parts of the directional control valve device 120 will then return to the positions in which they are shown in the drawing under the action of springs 129 and 139 as above described. With the directional control valve device thus returned to its normal position, fluid under pressure will be released from chamber 76 in the fuel cut-off valve device 60 by way of pipe 77 past the double check valve 121 and thence past the release valve 130 in the astern valve device 124 whereupon spring 79 will move latch 73 against the piston rod 67 so that it may become effective to hold said rod in the position for cutting off the supply of fuel to the engine upon a subsequent movement of said rod and of piston 66 to such position.

With the engine now running on fuel in the astern direction at an idling speed the operator may accelerate the engine to any desired degree by moving lever 175 from the "Idle" position adjacent recess 183 in the direction of the legend "Astern" (Fig. 2) for thereby effecting operation of the self-lapping valve device 160 to provide fluid at the proper pressure in the speed control pipe 164a, as hereinbefore described.

When pistons 66 and rod 67 in the fuel cut-off valve device 60 are returned to the position defined by contact between said piston and cover 65 the interlock valve devices 82 and 83 will be operated to close communication between pipes 84 and 85, and 55 and 45, respectively, and to open the latter two pipes to atmosphere. The opening of pipe 55 to atmosphere at this time is immaterial since it is void of fluid under pressure as will be apparent from the above description, but the opening of pipe 45 to atmosphere will permit release of fluid under pressure from the timing chamber 56 and diaphragm chamber 44 in the astern valve device 19 at a rate determined by the flow capacity of choke 64 in the check valve device 62 with respect to the volume of said chambers. This rate is such as to maintain the astern valve device 19 in the condition supplying fluid under pressure to pressure chamber 13 for a certain interval of time, after which the pressure in said chambers will become sufficiently reduced for spring 46 in the astern valve device 19 to move diaphragm 43 to its upper position and permit operation of the valve structure 23 to close communication between the fluid pressure supply passage 48 and pressure chamber 13 and to open said chamber to atmosphere for releasing actuating fluid pressure from said chamber. One reason for thus delaying the release of fluid under pressure from chamber 13 is to maintain pressure on the power piston for a sufficient period of time to insure complete movement thereof into engagement with the pressure head 15 and thereby proper positioning of the reversing control shaft 1 when reversing the engine as will be later described.

If the operator desires to stop the engine when it is operating in the astern direction he will move the control lever 175 back to neutral position to permit operation of the astern valve device 157 to open the astern control pipe 85 to atmosphere. The operator will also shift the lever 175 into recess 181 for operating the stop valve device 158 to supply fluid under pressure to pipe 164. Fluid thus supplied to pipe 164 will flow through the double check valve device 99 to pipe 69 and to piston chamber 68 in the fuel cut-off valve device 60. The pressure of fluid thus obtained in chamber 68 will then move piston 66 and rod 68 to the position defined by contact between said piston and shoulder 70 and this movement will move the fuel control lever 3 to the fuel cut-off position shown in the drawing, for thereby cutting off the supply of fuel to the engine, whereupon the engine will stop.

When rod 67 of the fuel cut-off valve device obtains the position shown in the drawings the latch 73 will be moved by spring 79 into the recess 74 in said rod. The operator may then move the control lever 175 out of the recess 181 back into slot 179 to effect operation of the stop valve device 158 to release fluid under pressure from chamber 68 in the fuel cut-off valve device 60, since the latch 73 will hold rod 67 in the position for maintaining the supply of fuel to the engine cut off.

It should also be noted that when the operator moves lever 175 to "Stop" position for supplying fluid under pressure to pipe 69 to effect operation of the fuel cut-off device 60, a portion of this fluid will flow to diaphragm chamber 224 in a starting interlock valve device 200. When the pressure in chamber 224 is then increased to a degree (thirty pounds) sufficient to overcome the opposing force of spring 221 said diaphragm will act to move sleeve 208 relative to and into contact with the valve 206 for closing communication between pipes 101 and 6. After the sleeve 208 contacts the valve 206 a further deflection of diaphragm 219 by pressure of fluid in chamber 224 will act through said valve to unseat the valve 203 against the pressure of spring 205 to thereby open pipe 6 to chamber 201 and thence to atmosphere. When subsequently the pressure of fluid in pipe 69 and thereby diaphragm chamber 224 is dissipated by movement of the operator's control lever 175 out of the recess 181 into slot 179, the spring 205 will seat the valve 203 and spring 221 will return the diaphragm 219 and sleeve 208 to the position shown in the drawing in which the valve 206 is open.

This operation of the starting interlock valve device 200 to first disconnect pipe 101 from pipe 6 and to connect the latter to atmosphere and to then reconnect said pipes upon movement of the operator's control lever, respectively, to "Stop" position and then out of said "Stop" position into recess 179 is immaterial and without effect when merely stopping the engine. However, it is very important in restarting the engine in the same direction it last operated, as above described, since with valve 206 open establishing the communication between pipes 101 and 6, the starting air valve device 5 will promptly operate to supply starting air to pipe 8 for starting the engine upon movement of the operator's control lever 175 to the proper "Start" position ("Astern" "Start" in the above description) so as to obtain starting of the engine in the shortest possible time.

With the engine stopped from last operation in an astern direction, if the operator should desire to start the engine in the ahead direction he will move lever 175 from its neutral position in the direction of the legend "Ahead" first to the "Idle" position and then to the "Start" position in recess 182. This operation of lever 175 will operate the ahead control valve device 156 to supply fluid under pressure to the ahead pipe 84 while permitting the astern control valve device 157 to remain in the condition opening the astern pipe 85 to atmosphere. This operation of lever 175 will also operate the starting valve device 159 to supply fluid under pressure to pipe 101 leading to the starting interlock valve device 200.

Fluid pressure thus supplied to the ahead pipe 84 will flow to the reversing interlock structure 92 and past the open valve 24 of the interlock valve device 93 therein to pipe 95 and thence past the double check valve 97, through pipe 98, and past the double check valve 99 to pipe 69 leading to chamber 68 in the fuel cut-off valve device 60 and to chamber 224 in the starting interlock valve device 200. The parts of the fuel cut-off valve device 60 being in their fuel cut-off position, as shown in the drawing, the pressure of fluid thus provided in chamber 68 will be without effect.

Fluid pressure supplied to the ahead pipe 84 as above mentioned will also flow past the open valve 86 in the interlock valve device 82 associated with the fuel cut-off device 60 to pipe 55 and thence to timing volume 57 and chamber 44 in the ahead pilot valve device 21 in the reversing fluid motor 10, it being noted that this supply of fluid to chamber 44 occurs at the same time as fluid is supplied to chamber 224 of the starting interlock valve device 200.

When the pressure of fluid in chamber 224 of the starting interlock valve device 200 is increased to the chosen degree of 30 pounds above mentioned the diaphragm 219 will deflect against spring 221 and thereby move sleeve 208 relative to and into contact with valve 206 for closing communication between pipe 101, which is supplied with fluid under pressure at this time by the starting valve device 159 in the operator's control device, and pipe 6 leading to a starting air valve device 5. Further movement of sleeve 208 by diaphragm 219 will then act through valve 206 to open valve 203 so as to open pipe 6 to atmosphere.

It will thus be seen that when the operator's control lever 175 is moved from neutral position to the "Ahead" "Start" position the starting interlock valve device 200 will operate just as soon as the chosen degree of pressure (thirty pounds) is obtained in diaphragm chamber 224, but prior to such operation for closing valve 206 there may be a slight flow of fluid under pressure from pipe 101 to pipe 6. The pressure (forty pounds) of spring 152 on piston 119 in the starting air valve device 5 is however sufficient to prevent operation of said device to supply starting air to the engine starting pipe 8 by the fluid pressure which may be thus obtained through pipe 6 in piston chamber 151.

As above mentioned, fluid pressure is supplied to diaphragm chamber 44 in the ahead pilot valve device 21 at the same time as fluid is supplied to cause operation of the starting interlock device 200, but since spring 46 opposing pressure of fluid in said chamber is such as to require an increase in pressure in said chamber to a degree higher (sixty pounds) than required to deflect diaphragm 219 in the starting interlock valve device 200, said pilot valve device will not operate until after said interlock device operates to open pipe 6 to atmosphere, so as to thereby insure that starting air will not be supplied to the engine upon initiating a reversal in the direction of engine operation, until after the engine reversing control shaft 1 has been conditioned to permit operation of the engine in the reversing direction i. e. in the ahead direction in the present instance, as will become apparent from the description to follow.

When the pressure of fluid in diaphragm chamber 44 in the ahead pilot valve device 21 becomes increased to a degree sufficient to overcome the opposing pressure of spring 46, diaphragm 43 will be deflected against said spring to effect operation of said device to supply fluid under pressure from supply pipe 48 to passage 54 and thence to piston chamber 12 in the motor 10. Chamber 13 at the opposite side of piston 11 is at this time open to atmosphere by way of the astern pilot valve device 19 since the astern control pipe 85 is open to atmosphere through the operator's control valve device 155, as above described. Thus when the pressure of fluid in piston chamber 12 is increased to a sufficient degree said piston will move toward and finally into contact with pressure head 15, and during such operation will turn the engine reversing control shaft 1 to the position to provide for operation of the engine in the ahead direction.

As the reversing piston 11 moves from its astern position, in which it is shown in the drawing, to its ahead position in contact with pressure head 15, its initial movement will cause operation of the astern interlock valve device 94 to establish communication between pipes 85 and 96 which is immaterial at this time but which is necessary for subsequent starting of the engine in the astern direction. The final movement of piston 11 just before it contacts the pressure head 15 will operate the ahead interlock valve device 93 to interrupt the communication between the ahead pipe 84 and pipe 95 and to vent pipe 95 to atmosphere, it being noted that the supply of fluid to pipe 95 and thus to diaphragm chamber 224 of the starting interlock device 200 by way of the double check valve devices 97 and 99 is therefore maintained until the reversing piston 11 substantially obtains its ahead position in contact with pressure head 15 and until the engine reversing control shaft 1 is in or substantially in its ahead position.

When pipe 95 is open to the atmosphere as just described fluid under pressure will be released from chamber 224 in the starting interlock valve device 200 through said pipe, and when the pressure of fluid in said chamber is thus sufficiently reduced spring 221 will return the diaphragm 219 and sleeve 208 to the position in which they are shown in the drawing which will permit closing of valve 203 by spring 205 and opening of valve 206 by spring 218. Fluid supplied to the starting air pipe 101 by operation of the starting valve device 159 with the operator's control lever in "Start" position in recess 182 will then flow to pipe 6 and thence to the starting air valve device 5 and cause operation of the latter device to supply engine starting air to pipe 8 to initiate turning of the engine under the influence of such starting air. Fluid pressure supplied to pipe 6 will also flow to piston chamber 150 in the directional control valve device 120 and move the disc 147 into frictional contact with the end of the crank shaft 9 so that said disc will turn in the direction of operation of the engine.

Fluid supplied to the ahead pipe 84 with the operator's control lever in the "Ahead," "Idle" and "Start" positions will also flow to chamber 127 in the ahead valve device 125 of the directional control valve device 120, but the respective valve 126 will be initially closed. As soon as the engine starts turning in the ahead direction under the influence of starting air supplied by the starting air valve device 5, the rotation of crank shaft 9 will turn the disc 147 in a clockwise direction, as viewed in Fig. 1a, and thereby rock lever 142 in a counterclockwise direction to effect operation of plunger 135 to close valve 130 and open valve 126 in the ahead valve device 125. In the ahead valve device 125 fluid pressure will then flow from chamber 127 past valve 126 to passage 123 and thence to the lower end of the double check valve 121, and since passage 122 open to the upper end of a double check valve 121 is at this time subject to atmospheric pressure past the open valve 130 in the astern valve device 124, the pressure of fluid provided in passage 123 will shift the double check valve 121 to its upper position closing communication between pipe 77 and passage 122 and opening said pipe to passage 123. Fluid under pressure will then flow from passage 123 to pipe 77 and thence to chamber 76 beneath the latch piston 75 and when the pressure of fluid in said chamber is thus increased to a degree sufficient to overcome the opposing pressure of spring 79 the piston 75 will operate to draw the latch 73 out of engagement with rod 67. Spring 72 in the fuel cut-off valve device will then move said rod 67 and piston 66 to the position in contact with cover 65 so as to permit movement of the fuel control shaft 2 and lever 3 from the fuel cut-off position to the fuel supply position indicated by line 4 for thereby supplying fuel to the engine. With the engine turning the engine will then fire on the fuel supplied.

As soon as the engine has fired on fuel the operator will move the control lever 175 out of the recess 182 to the adjacent "Idle" position to thereby effect operation of the starting valve device 159 to release fluid under pressure from pipe 101 and thus from pipe 6 and the starting air valve device 5 to permit operation of said starting air valve device to cut off the supply of starting air to the engine. With the engine running on fuel it will then continue to operate at an idling speed with the operator's control lever 175 in the "Ahead" "Idle" position cutting off the supply of starting air to the engine. When fluid under pressure is released from pipe 6 as just mentioned fluid will also be released from chamber 150 in the directional control device 120 to permit disc 147 to free itself from the end of the crank shaft. The parts of the directional control device will then return to the position in which they are shown in the drawing and in which pipe 77 will be opened to atmosphere past the release valve 130 in the ahead valve device 125. Fluid under pressure will therefore be released from the latch piston chamber 76 so that spring 79 will again move latch 73 into contact with rod 70.

When the fuel cut-off valve device 60 operates to permit movement of the fuel control lever 3 to its fuel supply position as above described, the associated interlock valve device 82 will operate to close communication between the ahead pipe 84 and the ahead control pipe 55 and to open the latter pipe to atmosphere. Fluid under pressure will then be released from chamber 44 in the pilot valve device 21 and said device will operate to release fluid under pressure from chamber 12 in the reversing motor 10 to thereby relieve said motor and the engine reversing control shaft of actuating force after said shaft has obtained the selected position. After the engine is running on fuel the operator by suitable adjustment of the control lever 175 between the "Idle" and "Full speed" positions at the "Ahead" side of "Stop" position may cause operation of the speed control device 160 to obtain any desired degree of speed of the engine.

From the above description of starting the engine in the ahead direction, from previous operation in the astern direction, it will be noted that the operation of the starting interlock valve device 200 prior to operation of the ahead pilot valve device 21 prevents the supply of any starting air to the engine until after the engine is conditioned for operation in the ahead direction.

With the engine operating in the ahead direction if the operator desires to stop the engine he will move the control lever 175 to the "Stop" position to thereby actuate the stop valve device 158 to supply fluid under pressure to pipe 164. Pipe 98 is at this time open to atmosphere through the interlock valve device 93 of the reversing interlock structure 92 as above described, so that fluid supplied to passage 164 will flow to pipe 69 and thence to piston chamber 68 in the fuel cut-off device 60. The pressure of fluid thus provided in chamber 68 will actuate piston 66 and rod 67 to move the fuel control lever 3 to its fuel cut-off position to thereby cut off the fuel supply to the engine whereupon the engine will stop. It will be noted that fluid pressure supplied to pipe 69 will also flow to chamber 224 in the starting interlock valve device 200 and effect operation of said device, but such operation is immaterial and without effect at this time since the starting control pipe 101 is open to atmosphere through the starting valve device 159 in the operator's control valve device 155.

As soon as the engine comes to a stop the operator may move lever 175 out of the "Stop" position into the adjacent portion of slot 179 to thereby effect operation of the stop valve device 158 to release fluid under pressure from pipes 164, 69, and thereby from piston chamber 68 in the fuel cut-off device 60 and from chamber 224 in the starting interlock device 200. Pipe 77 is at this time open to atmosphere as above described so that when rod 67 in the fuel cut-off valve device is moved to its fuel cut-off position, spring 79 will actuate piston 75 to move latch 73 into interlocking engagement with said rod. Thus the rod 67 will remain in the position for holding the fuel cut-off lever 3 in its fuel cut-off position when fluid under pressure is vented from chamber 68. When fluid is vented from chamber 224 in the starting interlock valve device 200 the parts of said device will also return to the position in which they are shown in the drawing.

When the operator's control lever 175 is operated to effect stopping of the engine from operation in the ahead direction as just described, the operation of the fuel cut-off piston 66 to cut off the supply of fuel to the engine will also effect operation of the interlock valve device 82 to reestablish communication between the ahead control pipe 55 and the ahead pipe 84 which latter part is vented at this time through the ahead valve device 156 in the operator's control valve device, and to also reestablish communication between the astern control pipe 45 and the astern pipe 85 which also is vented at this time through the astern valve device 157 in the operator's control valve device.

With the engine stopped from last operation in an ahead direction, if the operator now desires to restart the engine in the ahead direction he will again move lever 175 into the starting recess 182 and this operation will effect operation of the ahead valve device 156 to again supply fluid under pressure to the ahead control pipe 84, and will also effect operation of the starting valve device 159 to supply fluid under pressure to pipe 101.

Fluid pressure thus supplied to the ahead pipe 84 will flow through the interlock device 82 associated with the fuel cut-off valve device 60 to cause operation of the pilot valve device 21 associated with the reversing motor 10 to resupply fluid under pressure to chamber 12, but such fluid will be without effect in said motor since piston 11 and thus the engine reversing control shaft 1 are already in the ahead position. With piston 11 in the ahead position communication between the ahead pipe 84 and pipe 95 will be closed and the latter pipe will be open to atmosphere and thus chamber 68 in the fuel cut-off device 60 and chamber 224 in the starting interlock device 200 will also be open to atmosphere. Fluid pressure supplied to pipe 101 by operation of the operator's control valve device will therefore be permitted to promptly flow to pipe 6 and thence to the starting air valve device 5 and cause operation thereof to supply starting air to the engine to initiate turning thereof in the ahead direction. The fluid pressure supplied to pipe 6 will also cause operation of the directional control device 120, upon starting of the engine to turn, to supply fluid under pressure from the ahead pipe 84 to pipe 77 through which it will flow to chamber 76 in the fuel cut-off device 60 and therein act to cause operation of piston 75 to withdraw latch 73 from shaft 67. Spring 72 will then move piston 66 and rod 67 to the right-hand position to permit movement of the fuel control shaft 2 and lever 3 to their fuel supply position for supplying fuel to the engine. After the engine fires and is running on fuel supplied thereto the operator will then move lever 175 out of the starting recess 182 into the adjacent portion of slot 179 for effecting operation of the starting valve device 159 to open pipe 101 to atmosphere for thereby causing operation of the starting air valve device 5 to cut off the supply of starting air to the engine. With the engine now running on fuel and the supply of starting air cut off, the operator by suitable adjustment of his control lever 175 may cause operation of the engine in the ahead direction at any desired speed as previously described.

With the engine running in the ahead direction let it now be assumed that the operator desires to reverse the direction of engine operation in as short a period of time as possible. To accomplish this he will move lever 175 from the "Ahead" side of "Stop" position into the starting recess 183 at the opposite or "Astern" side of "Stop" position, without any hesitation in the neutral or "Stop" position.

This movement of lever 175 will cause operation of the astern valve device 157 in the operator's control valve device to supply fluid under pressure to the astern pipe 85, while allowing the ahead valve device 156 to maintain the ahead pipe 84 open to atmosphere, and the starting valve device 159 will also be operated to supply fluid under pressure to pipe 101. Fluid thus supplied to the astern pipe 85 will flow through the interlock valve device 94 associated with the reversing interlock structure 92 to pipe 96 and with pipe 95 vented, fluid will flow from pipe 96 to pipe 98 leading to the double check valve device 99. Pipe 164 is at this time vented through the stop valve device 158 associated with the operator's control valve device, so that fluid will flow from pipe 98 to pipe 69 and thence to piston chamber 68 in the fuel cut-off valve device 60 and also to piston chamber 224 in the starting interlock device 200. The pressure of fluid thus provided in chamber 68 will move piston 66 and rod 67 to the position in which they are shown in the drawing for thereby moving the fuel control lever 3 to its fuel cut-off position to cut off the supply of fuel to the engine so that it may stop from operation in the ahead direction. Pipe 77 is at this time open to atmosphere through the ahead valve device 125 in the directional control device 120, so that when rod 67 in the fuel cut-off valve device obtains its fuel cut-off position, spring 79 will move latch 73 into interlocking engagement with said rod to secure same in said position.

When the pressure of fluid supplied through pipe 69 to chamber 224 in the starting interlock valve device 200 is increased to the chosen degree of thirty pounds above described, said device will operate to close communication between pipe 6 and pipe 101, which is supplied with fluid under pressure at this time by the starting valve device 159 in the operator's control device, so as to prevent operation of the starting air valve device 5 to supply starting air to pipe 8 and thence to the engine.

With the fuel cut-off device 60 in the fuel cut-off position shown in the drawing, fluid supplied to the astern pipe 85 will flow through the interlock valve device 83 to the astern control pipe 45 and thence to chamber 56 and diaphragm chamber 44 in the astern pilot valve device 19 associated with the reversing motor 10. When the pressure of fluid in chamber 44 is then increased to a sufficient degree (sixty pounds) to overcome the opposing pressure of spring 46 in the astern pilot valve device, said device will operate to supply fluid under pressure to chamber 13 at the right-hand side of the reversing piston 11. Chamber 12 at the opposite side of piston 11 is at this time open to atmosphere through the ahead pilot valve device 21, so that pressure of fluid supplied to chamber 13 will then move piston 11 from its ahead position defined by contact with pressure head 15 to its astern position defined by contact with pressure head 18.

Just before piston 11 obtains its astern position the astern interlock valve device 94 will be operated to close communication between pipe 85 and pipe 96 and to open the latter to atmosphere while in the ahead valve device 94 communication will be reestablished between the ahead pipe 84 and pipe 95. With pipe 96 thus open to atmosphere, fluid under pressure will be released from piston chamber 68 in the fuel cut-off valve device 60 and from chamber 224 in the starting interlock valve device 200. The latch 73 is at this time still in interlocking engagement with rod 67 so that the parts of the fuel cut-off valve device 60 will remain in their fuel cut-off position in which they are shown in the drawing. When however the pressure of fluid in diaphragm chamber 224 in the starting interlock device 200 is sufficiently reduced spring 221 will return the diaphragm 219 and sleeve 208 to the position in which they are shown in the drawing to permit closure of valve 203 and opening of valve 206. Fluid present in pipe 101 at this time will then flow to pipe 6 and thence to the starting air valve device 5 to cause operation thereof to supply starting air to the engine. If the engine is still turning in the ahead direction this starting air supplied to pipe 8 will become effective as a brake in the engine to immediately stop same and to then restart the engine in the reverse or astern direction, as determined by the astern position of the engine reversing control shaft 1.

Figure 1:
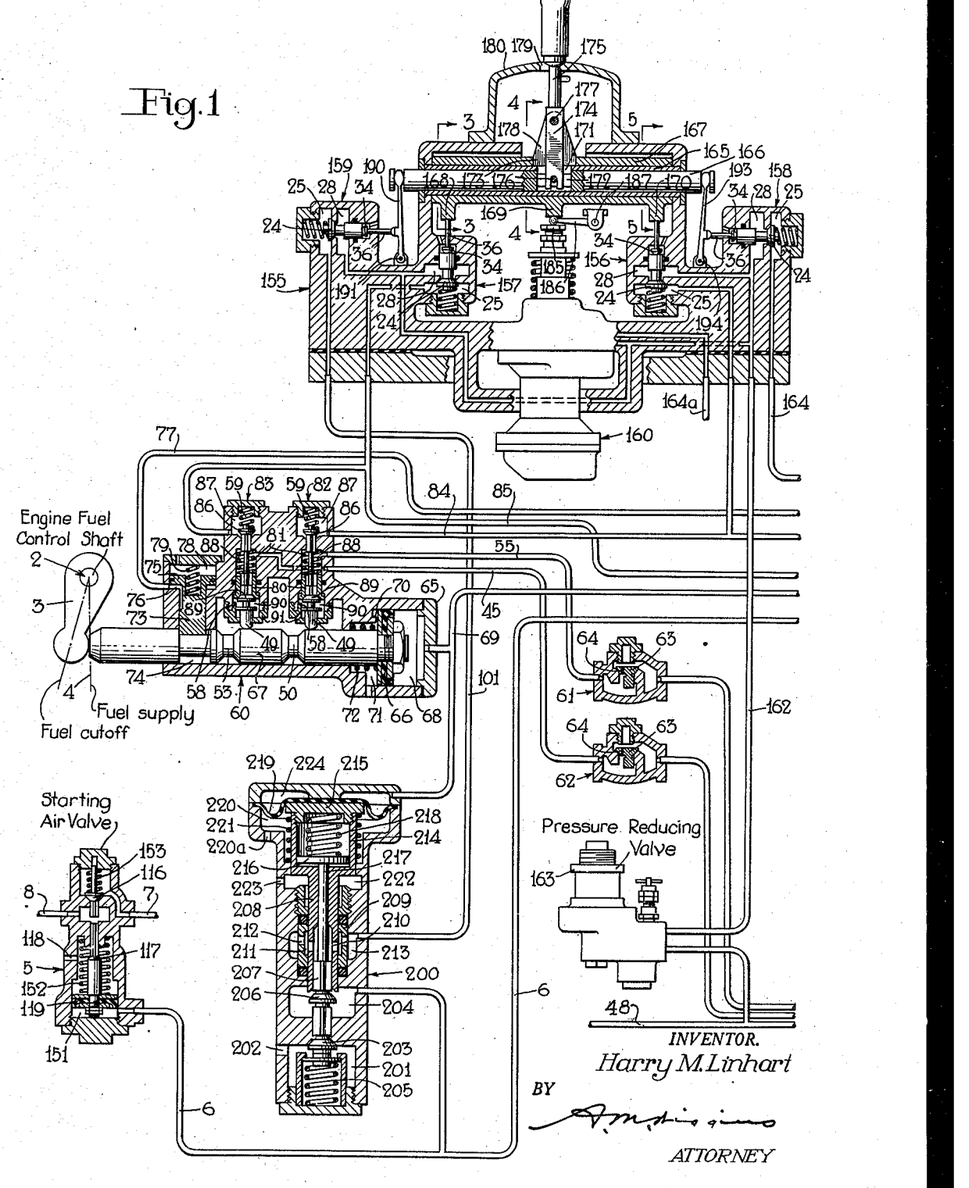

Fluid under pressure supplied to pipe 6 by operation of the starting interlock valve device 200 as just described will also flow to piston chamber 150 in the directional interlock valve device 120 and therein act on piston 148 to move disc 147 into frictional engagement with the end of the crank shaft 9. If at the time this occurs the engine is still operating in the ahead direction the disc 147 will be turned in a clockwise direction as viewed in Fig. 1a and thereby operate the associated ahead valve device 125 to establish communication between pipe 84 and passage 123, while allowing the parts of the astern valve device 124 to remain in the position in which they are shown in Fig. 1a closing communication between the astern pipe 85 and passage 122. Since the ahead pipe 84 is open to atmosphere through the operator's control valve device 155 at this time this operation of the directional control device will be without effect. However as soon as the engine comes to a stop and then starts to turn in the astern direction the friction disc 147 will turn in a corresponding or counterclockwise direction as viewed in Fig. 1a and thereby operate the astern valve device 124 to open communication between the astern pipe 85 and passage 122. Fluid under pressure will then flow from the astern pipe 84 to passage 122 leading to upper end of the double check valve 121. Passage 123 leading to the lower end of the double check valve 121 is at this time open to atmosphere through the ahead valve device 125, so that pressure of fluid present in passage 122 will shift the double check valve 121 to its lower position and then become effective through pipe 77 in chamber 66 below the latch piston 75. The latch piston 75 will thereby be moved against spring 79 to withdraw latch 73 from interlocking engagement with rod 67. Spring 72 will then move rod 67 and the piston 66 to the position defined by contact with cover 65, so that the fuel control lever 3 may move from its fuel cut-off position, in which it is shown in the drawing, to its fuel supply position indicated by the line 4. With the engine turning under the influence of starting air the engine will then fire on the fuel supplied thereto.

After the engine fires as just mentioned the operator will move lever 175 out of the starting recess 183 into the adjacent portion of slot 179. This movement of the operator's control lever will effect operation of the starting valve device 159 to cut off the supply of fluid under pressure to pipe 101 and to open said pipe to atmosphere. Since pipe 6 is open to pipe 101 at this time fluid under pressure will be also released from pipe 6 to permit operation of the starting air valve device 5 to cut off the supply of starting air to the engine and to also permit release of fluid under pressure from chamber 150 in the directional control device 120, so that the friction disc 147 may become disengaged from the end of the crank shaft 9. The parts of the directional control device 120 will then return to the position in which they are shown in the drawing whereupon pipe 77 will be open to atmosphere through the astern valve device 124 and fluid will therefore be released from the latch piston chamber 76. Spring 79 will then move the latch 73 back into contact with the fuel cut-off 67 so that said latch may be effective to interengage with said rod in recess 74 upon subsequent stopping of the engine.

With the engine now running on fuel and the supply of starting air cut off, the speed of the engine in the astern direction may be adjusted by operation of lever 175 in the manner above described.

In the operation of the apparatus to reverse the direction of operation of the engine from ahead to astern it will be noted that the starting interlock valve device 200 operates the same as in starting the engine from stop, in a direction the reverse of last operation, to prevent all supply of starting air to the engine until after the engine is conditioned by operation of motor 10 for operation in the new direction.

With the engine operating in the astern direction the operator by moving lever 175 from the "Astern" side of "Stop" position into the starting recess 182 at the "Ahead" side of "Stop" position may obtain a reversal in the direction of operation of the engine from astern to ahead in a manner which will be readily apparent from the above description of reversal in direction of engine operation from ahead to astern, and the starting interlock valve device 200 will operate in the same manner to prevent any starting air being obtained through pipe 8 to the engine until after the engine reversing control shaft 1 is conditioned to allow operation of the engine in the new or selected direction.

If, when the operator's control lever 175 is operated to cause starting and operation of the engine in a direction the reverse of the direction of last operation, the reversing motor 10 should fail to operate to condition the engine for operation in the new selected direction, the starting interlock valve device 200 under influence of fluid pressure from either the ahead pipe 84 or the astern pipe 85, as the case may be, will maintain pipe 6 disconnected from the starting control pipe 101 and open to atmosphere, so as to prevent starting air being supplied to the engine. This is very desirable for at least two reasons. One reason is that if the reversing motor failed to operate in response to operation of the operator's control lever to stop the engine from operation in one direction and to start it in the opposite direction, and starting air were supplied to the engine it would prevent the engine from stopping and cause it to continue to operate which, in case of boat propulsion, might cause the boat to ram another boat or object and result in property damage. The same result might also occur in starting the engine from stop in either direction the reverse of the direction last operated, since under such a condition if starting air were supplied to the engine it would cause operation of the engine in the direction opposite that intended. The starting interlock valve device 200 however will prevent unwarranted supply of starting air to the engine under either of these conditions and thus avoid possible damage which could arise therefrom.

In the above description of the engine control structure the terms "ahead" and "astern" have been used only for illustration and are to be considered as synonymous with respectively, "forward" and "reverse", or "one" and "opposite" direction.

*Summary*

From the above description it will now be seen that I have provided control apparatus of the general type disclosed in the aforementioned patent to Roy R. Stevens embodying means which will prevent starting air being supplied to cause starting of the engine except when desired. More specifically, the apparatus insures that starting air will not be supplied to the engine in reversing the direction of engine operation until after the engine is conditioned to operate in the reverse direction. The apparatus also prevents supply of starting air to the engine in case the engine reversing means including the motor 10 fails to operate as intended. Still further, the starting interlock valve device 200 normally opens communication between the starting control pipe 101 and pipe 6 leading to the starting air valve device 5 so that in restarting the engine in the last direction of operation there will be no delay in obtaining operation of the starting air valve device in response to operation of the operator's control lever 175, whereby restarting of the engine under this condition will be obtained in the shortest possible time.

Having now described my invention, what I claim as new and desire to secure by Letters Patent is:

1. An apparatus for controlling the supply of starting air to a reversible engine comprising in combination, reversing means operable upon supply of fluid at a certain pressure to a chamber to condition said engine for operation in a reverse direction, valve means arranged to control the supply of starting air to said engine and operable upon supply of fluid at a lower pressure to another chamber to prevent supply of starting air and operable upon release of fluid under pressure from said other chamber to permit supply of starting air to said engine, an operator's control device operable to supply fluid under pressure to both of said chambers, and valve means controlled by said reversing means controlling the fluid pressure supply communication to said other chamber and operable by said reversing means upon conditioning of said engine for operation in said reverse direction to close said communication and to open said other chamber to atmosphere for releasing fluid under pressure therefrom.

2. An apparatus for controlling the supply of starting air to a reversible engine comprising in combination, reversing means operable upon supply of fluid at a chosen pressure to a chamber to condition said engine for operation in a reverse direction, means operative to prevent operation of said reversing means by fluid at a pressure lower than said chosen pressure, starting air control valve means operable upon supply of fluid under pressure to another chamber to prevent supply of starting air to said engine and operable upon release of fluid under pressure from said other chamber to supply starting air to said engine, means operable to render said starting air valve means operable to prevent supply of starting air to said engine by fluid in said other chamber at a pressure lower than said chosen pressure, an operator's control device operative to supply fluid under pressure to both of said chambers, and valve means controlling the fluid pressure supply communication between said operator's control device and said other chamber and operable by said reversing means upon conditioning of said engine for operation in said reverse direction to close said communication and to release the fluid under pressure from said other chamber.

3. An apparatus for controlling the supply of starting air to a reversible engine comprising in combination, reversing means operable by fluid under pressure in a chamber to condition said engine for operation in a reverse direction, starting air control valve means for said engine operable by fluid under pressure in another chamber to prevent supply of starting air to said engine and operable upon release of fluid under pressure from said other chamber to supply starting air to said engine, an operator's control device operable to supply fluid under pressure to both of said chambers, and valve means controlling the fluid pressure supply communication between said operator's control device and said other chamber and operable by said reversing means upon conditioning of said engine for operation in said reverse direction to close said communication and to release fluid under pressure from said other chamber.

4. An apparatus for controlling the supply of starting air to a reversible engine comprising in combination, a starting air valve device operable upon supply of fluid at a certain pressure to a chamber to supply starting air to the engine and operable to cut off the supply of starting air when the pressure of fluid in said chamber is of a lower degree, a starting control pipe, starting interlock means controlling communication between said pipe and chamber and operable upon supply of fluid to a second chamber at a pressure lower than said certain pressure to close said communication and operable upon release of fluid under pressure from said second chamber to open said communication, reversing means for said engine operable upon supply of fluid to a third chamber at a pressure greater than said certain pressure to condition said engine for operation in a reverse direction, means operable to prevent operation of said reversing means by fluid in said third chamber at a pressure less than said greater pressure, an operator's control device having a start position and being operable therein to supply fluid under pressure to said second and third chambers and to said starting control pipe and having another position and being operable in said other position to cut off the supply of fluid under pressure to said starting control pipe, and valve means controlling the fluid pressure supply communication between said operator's control device and said second chamber and being operable by said reversing means to close said communication and to release fluid under pressure from said second chamber upon conditioning of said engine for operation in said reverse direction.

5. An apparatus for controlling the supply of starting air to a reversible engine comprising in combination, reversing means operable to condition said engine for operation in a reverse direction, fluid pressure controlled valve means arranged to control the supply and the cut off of the supply of starting air to said engine, an operator's control device operable to effect operation of said reversing means and to control pressure of controlling fluid on said valve means, and interlock means controlled by said reversing means controlling the fluid control communication between said operator's control device and said valve means, said reversing means being operable, during reversing operation thereof to condition said engine for operation in said reverse direction, to close said communication and to effect operation of said valve means to prevent supply of starting air to said engine, and being operable upon conditioning of said engine for operation in said reverse direction to open said communication.

6. An apparatus for controlling the supply of starting air to a reversible engine comprising in combination, reversing means movable to one position to condition said engine for operation in one direction and to a second position to condition said engine for operation in the opposite direction, an operator's control device operable in one position to effect movement of said reversing means to its one position and operable in a second position to effect movement of said reversing means to its second position and being operable in both of its said positions to supply fluid under pressure to a pipe and being also operable to release fluid under pressure from said pipe, starting air control means arranged to be operable by fluid under pressure in a control chamber to supply starting air to said engine and upon release of such fluid pressure to cut off the supply of starting air to said engine, interlock means controlling a communication between said pipe and control chamber, and means controlled by said reversing means operable upon operation of said operator's control device to either of its positions to effect reversing operation of said reversing means, and during such reversing operation, to effect operation of said interlock means to close said communication and operable upon movement of said reversing means to the position corresponding to that of said operator's control device to open said communication.

7. An apparatus for controlling the supply of starting air to a reversible engine comprising in combination, a starting control pipe, starting air supply means arranged to be operated by fluid under pressure from said pipe to effect starting of said engine, starting interlock means controlling communication between said pipe and starting air supply means and operable upon supply of fluid under pressure to a chamber to close said communication and operative upon release of fluid under pressure from said chamber to open said communication, an ahead pipe, an astern pipe, an operator's control device having ahead and astern starting positions and being operable therein to supply fluid under pressure to respectively said ahead and astern pipes and also to said starting control pipe, engine reversing means movable upon supply of fluid under pressure to said ahead pipe to an ahead position to condition said engine for operation in an ahead direction and movable upon supply of fluid under pressure to said astern pipe to condition said engine for operation in an astern direction, and valve means controlled by said reversing means and operable in said ahead position and during movement to said astern position to establish communication between said chamber and said astern pipe and being operable in said astern position and during movement to said ahead position to establish communication between said chamber and said ahead pipe.

8. A control apparatus for a reversible engine comprising in combination, engine starting air control valve means operable upon supply of fluid under pressure to a chamber to prevent supply of starting air to said engine and operable upon release of fluid under pressure from said chamber to permit supply of starting air to said engine, an ahead pipe, an astern pipe, engine reversing control means movable to an ahead position upon supply of fluid under pressure to said ahead pipe or to an astern position upon supply of fluid under pressure to said astern pipe and being operable therein to condition said engine for operation in either an ahead direction or an astern direction, respectively, an operator's control device having ahead and astern positions and being operable upon movement to said ahead position to supply fluid under pressure to said ahead pipe and to open said astern pipe to atmosphere and being operable upon movement to said astern position to supply fluid under pressure to said astern pipe and to open said ahead pipe to atmosphere, and valve means controlled by said reversing means and operable in its ahead position and during movement to its astern position to open said chamber to said astern pipe and being operable in its astern position and during movement to its ahead position to open said chamber to said ahead pipe.

9. An apparatus for controlling the supply of starting air and of fuel to a reversible engine comprising in combination, an operator's control device having an ahead position and an astern position, reversing means operable upon movement of said operator's control device to said ahead position to condition said engine for operation in an ahead direction and operable upon movement of said operator's control device to said astern position to condition said engine for operation in an astern direction, starting air valve means operable by fluid under pressure to supply starting air to said engine, interlock means operable upon release of fluid under pressure from a chamber to supply actuating fluid under pressure to said starting air valve means and upon supply of fluid under pressure to said chamber to release actuating fluid under pressure from said starting air valve means, means controlled by said reversing means and operable upon conditioning of said engine for operation in a direction to correspond to the position of said operator's control device to release fluid under pressure from said chamber and at other times to supply fluid under pressure to said chamber, fuel control means for said engine movable to a fuel cut-off position in response to operation of said operator's control device to effect operation of said reversing means, other means operable to move said fuel control means to a fuel supply position, directional control means adapted to be operated by said actuating fluid under pressure to respond to direction of operation of said engine and being non-responsive upon release of said actuating fluid under pressure, said directional control means being operable upon operation of said engine in a direction corresponding to the position of said operator's control device to render said other means effective and upon operation of said engine in a direction contrary to the position of said operator's control device to render said other means ineffective.

HARRY M. LINHART.

REFERENCES CITED

The following references are of record in the file of this patent:

UNITED STATES PATENTS

| Number | Name | Date |
|---|---|---|
| 2,304,161 | Froehlich et al. | Dec. 8, 1942 |
| 2,304,472 | Olsson | Dec. 8, 1942 |